United States Patent Office 3,154,490
Patented Oct. 27, 1964

3,154,490
MINERAL LUBRICATING OIL COMPOSITIONS
Charanjit Rai and John B. Braunwarth, Crystal Lake, Ill., assignors to The Pure Oil Company, Chicago, Ill., a corporation of Ohio
No Drawing. Filed June 14, 1961, Ser. No. 116,934
4 Claims. (Cl. 252—47)

This invention relates to new antioxidants comprising di(2-benzothiazolyl)alkanes. More particularly, this invention relates to the discovery that di(2-benzothiazolyl)alkanes are effective antioxidants and suitable for use in mineral lubricating oil compositions and other compositions for the purpose of inhibiting oxidation reactions.

It is known in the art that mercaptobenzothiazoles are antioxidants for highly refined oils. One derivative thereof, namely di(benzothiazolyl)disulfide, is a particularly effective antioxidant. Mercaptoarylthiazoles are also used as corrosion inhibitors. Also, N,N'-alkylenecyanine dyes are prepared by the reaction of di-2-benzothiazolyl-methane with d-2-quinolylmethane.

Accordingly, it becomes a primary object of this invention to provide new antioxidants comprising di(2-benzothiazolyl)alkanes and derivatives thereof.

Another object of this invention is to provide compositions containing a sufficient amount of di(2-benzothiazolyl)alkanes, or derivatives thereof or mixtures of such compounds, to inhibit oxidation of the compositions.

Still a further object of this invention is to provide hydrocarbon compositions containing oxidation-inhibiting amounts of di(2-benzothiazolyl)alkanes, or derivatives thereof or mixtures of such compounds.

And another object of this invention is to provide mineral lubricating oil compositions adapted for use in lubricating moving metal parts, such as those of internal-combustion engines, which compositions contain low concentrations, preferably in the range of about 0.5 to 3.0% by weight, of di(2-benzothiazolyl)alkanes or derivatives thereof.

Another object of this invention is to provide lubricating compositions of natural or synthetic origin containing sufficient amounts of di(2-benzothiazolyl)alkanes to inhibit oxidation of such compositions under service conditions involving elevated temperatures.

These and other objects of this invention will be described or become apparent as the description proceeds.

The new antioxidants of this invention are characterized by having a di(2-benzothiazolyl)alkane nucleus containing from 1 to 12 methylene groups. These compounds consist of two benzothiazole groups connected through one or more methylene groups, or a polymethylene chain, as represented by the formula,

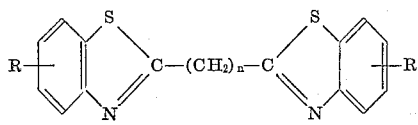

wherein $n$ has a value of 1 to 12 and R and R' are hydrogen, or the same or different hydrocarbon radicals containing from 1 to 20 carbon atoms. These compounds are prepared by various known methods, such as described in J. Chem. Soc., 2393 (1928), by M. A. Phillips; Ber., 13, 1231 (1880), and Ber., 20, 2251 (1887), by A. W. Hofman; J. Chem. Soc., 121, 464 (1922), by W. A. Mills; and Rai and Braunwarth, J. Org. Chem., 26 (1961).

R and R' can be hydrogen, or alkyl, aryl, aralkyl, alkaryl, or cycloalkyl radicals including methyl, ethyl, propyl, isopropyl, butyl, isobutyl, t-butyl, amyl, isoamyl, t-amyl, hexyl, isohexyl, heptyl, isoheptyl, octyl, isooctyl, nonyl, isononyl, decyl, undecyl, dodecyl, tridecyl, tetradecyl, pentadecyl, hexadecyl, heptadecyl, octadecyl, monadecyl and eicosyl radicals in the aliphatic series. The aryl groups include phenyl, naphthyl, and biphenyl; the aralkyl groups include benzyl, phenylethyl, etc.; the alkaryl groups include tolyl, xylyl, and the like; and the cycloalkyl radicals may be cyclopropyl, cyclobutyl, cyclopentyl, and cyclohexyl radicals.

Species of compounds that come within the foregoing definition of the invention are:

1,1 - bis(2 - benzothiazolyl)methane or di(2 - benzothiazolyl)methane
1,2-bis(2-benzothiazolyl)ethane
1,3-bis(2-benzothiazolyl)propane
1,4-bis(2-benzothiazolyl)butane
1,5-bis(2-benzothiazolyl)pentane
1,6-bis(2-benzothiazolyl)hexane
1,7-bis(2-benzothiazolyl)heptane
1,8-bis(2-benzothiazolyl)octane
1,9-bis(2-benzothiazolyl)nonane
1,10-bis(2-benzothiazolyl)decane
1,11-bis(2-benzothiazolyl)undecane
1,12-bis(2-benzothiazolyl)dodecane
1,13-bis(2-benzothiazolyl)tridecane
1,14-bis(2-benzothiazolyl)tetradecane
1,15-bis(2-benzothiazolyl)pentadecane
1,16-bis(2-benzothiazolyl)hexadecane
1,17-bis(2-benzothiazolyl)heptadecane
1,18-bis(2-benzothiazolyl)octadecane
1,19-bis(2-benzothiazolyl)nonadecane
1,20-bis(2-benzothiazolyl)eicosane When R or R' are alkyl radicals, examples are:

4-methyl-1,1-bis(2-benzothiazolyl)methane
7,7'-dimethyl-1,1-bis(2-benzothiazolyl)methane
6,7-dimethyl-1,1-bis(2-benzothiazolyl)methane
5,7-dimethyl-1,1-bis(2-benzothiazolyl)methane
4,5'-dimethyl-1,1-bis(2-benzothiazolyl)methane 5-ethyl-1,1-bis(2-benzothiazolyl)methane
6,6'-diethyl-1,1-bis(2-benzothiazolyl)methane
4,5-dioctyl-1,1-bis(2-benzothiazolyl)methane
4,7-dieicosyl-1,1-bis(2-benzothiazolyl)methane
4,6-diisopropyl-4',6'-diisopropyl-1,1-bis(2-benzothiazolyl)methane
5,6-dibutyl-4',5'-diamyl-1,1-bis(2-benzothiazolyl)methane
4-methyl,6-nonyl,5'-ethyl,7'-undecyl-1,1-bis(2-benzothiazolyl)methane 5-eicosyl-1,3-bis(2-benzothiazolyl)propane
6,6'-dihexyl-1,3-bis(2-benzothiazolyl)propane
5,6-di-t-butyl-1,3-bis(2-benzothiazolyl)propane
5,7-diundecyl-1,3-bis(2-benzothiazolyl)propane
4,5'-diethyl-1,3-bis(2-benzothiazolyl)propane
7-pentyl-1,3-bis(2-benzothiazolyl)propane 4-methyl,5-butyl,6'-propyl-1,4-bis(2-benzothiazolyl)butane
5-octadecyl,7'-heptyl-1,5-bis(2-benzothiazolyl)pentane
4,4'-dioctyl-1,11-bis(2-benzothiazolyl)undecane
6,7-dimethyl-4,5'-dimethyl-1,20-bis(2-benzothiazolyl)eicosane When R or R' are aryl radicals, examples are:

4-phenyl-1,1-bis(2-benzothiazolyl)methane
5,7'-diphenyl-1,7-bis(2-benzothiazolyl)heptane
6-naphthyl-1,13-bis(2-benzothiazolyl)tridecane
4-phenyl,5'-biphenyl-1,16-bis(2-benzothiazolyl)hexadecane When R or R' are aralkyl radicals, examples are:

5-benzyl-1,4-bis(2-benzothiazolyl)butane
6-benzyl-7'-benzyl-1,14-bis(2-benzothiazolyl)tetradecane
7-phenethyl-1,18-bis(2-benzothiazolyl)octadecane
6-phenylethyl-4'-benzyl-1,1-bis(2-benzothiazolyl)methane When R or R' are mixed alkyl, cycloalkyl or aryl radicals, examples are:

4-methyl-4'-phenyl-1,1-bis(2-benzothiazolyl)methane
5-t-butyl-7'-naphthyl-1,3-bis(2-benzothiazolyl)propane
6,7-diethyl,4'-phenyl-1,4-bis(2-benzothiazolyl)butane
4-cyclohexyl,5-phenyl-1,5-bis(2-benzothiazolyl)pentane
5-methyl,6-phenyl,4'-ethyl,7'-naphthyl-1,6-bis(2-benzothiazolyl)hexane
4,5,6,7-tetraethyl,4'-cyclohexyl-1,7-bis(2-benzothiazolyl)heptane In accordance with this invention, any one or mixtures of two or more of the foregoing compounds are incorporated in a liquid system at low concentrations, preferably within the range of 0.5 to 3.0% by weight for service under conditions conducive to oxidation of the system, whereby the compounds inhibit the oxidation. The liquid system may comprise any system used under conditions where it is desired to inhibit oxidation and in which a small but effective quantity of the compounds can be incorporated. The foregoing compounds are generally water-insoluble but are soluble in organic solvents, hydrocarbons, mineral oils, and synthetic lubricants. However, the water-insoluble compounds of this invention can be incorporated in water systems by the addition of an emulsifier, coupling agent, or carrier liquid which is water-soluble or water-miscible. One application would be in water, water-alcohol, or water-glycol solutions used in automobile radiators or cooling systems of heat exchangers and distillation towers. Another application would be in gasolines, diesel fuels, and rocket fuels. Synthetic lubricants such as hydrocarbon polymers, the various silicones, polyaryl ethers, di- and polyesters, and phosphate esters may be benefited by incorporating the anti-oxidants of this invention. A specific application is in mineral lubricating oil compositions, containing or not containing other addends such as pour-point depressants, foam depressants, VI improvers, extreme-pressure agents, lubricity agents, and the like, wherein service at elevated temperatures presents a problem of oxidation. One such composition comprises a refined mineral lubricating oil fortified by addends for use in the modern internal combustion engine and containing from about 0.5 to 3.0% by weight of any one or mixtures of the foregoing compounds.

Tests conducted using the compounds of this invention show that they are effective in small concentrations at temperatures as high as 375° F. for preventing oxidation. In order to illustrate the invention, the effectiveness of our additives has been demonstrated by determining the oxygen absorption rate of a heavy neutral oil held at 300° F. The oil was a 350 vis. (at 100° F.) neutral having a viscosity index of 102 and an API gravity of 30.3. Each of the test additives was present at a concentration of 2% w. The results were as follows:

| Oxidation Inhibitor | Oxygen Absorption Rate at 300° F. (cc./min.) |
|---|---|
| None (Blank) | 0.19 |
| 1,1-Bis(2-benzothiazolyl)methane | 0.095 |
| 1,8-Bis(2-benzothiazolyl)octane | 0.071 |
| Phenothiazine | 1.40 |

These results indicate that the compounds of this invention are more effective than known oxidation inhibitors (e.g., phenothiazine) which at the moderately elevated temperature conditions of the test actually accelerated oxidation. However, phenothiazine is effective at higher temperatures (450°–700° F.) as an anti-oxidant.

Another use for the oxidation inhibitors of this invention, since they are effective at elevated temperatures, is in the distillation of naphthas wherein the development of odor and decomposition is a problem.

The embodiments of the invention in which an exclusive property or privilege is claimed are defined as follows:

1. A mineral oil composition comprising a major portion of a mineral oil and about 0.5 to 3.0% by weight of an antioxidant of the formula,

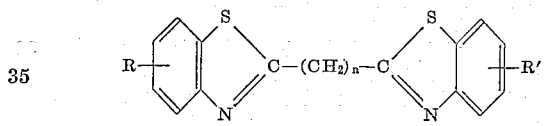

wherein $n$ has a value of 1 to 12 and R and R' are substituents of the group consisting of hydrogen and hydrocarbon radicals containing 1 to 20 carbon atoms.

2. A mineral oil composition comprising a major portion of mineral lubricating oil containing about 0.5 to 3.0 wt. percent of 1,1-bis(2-benzothiazolyl)methane.

3. A mineral oil composition comprising a major portion of mineral lubricating oil containing about 0.5 to 3.0 wt. percent of 1,8-bis(2-benzothiazolyl)octane.

4. A mineral oil composition comprising a major portion of mineral lubricating oil and about 0.05 to 3.0 wt. percent of 1,2-bis(2-benzothiazolyl)ethane.

References Cited in the file of this patent

UNITED STATES PATENTS

| 2,218,283 | Fuller | Oct. 15, 1940 |
| 2,483,392 | Meyer et al. | Oct. 4, 1949 |
| 2,541,400 | Brooker et al. | Feb. 13, 1951 |
| 2,669,544 | Lowe | Feb. 16, 1954 |
| 2,785,129 | Quimby et al. | Mar. 12, 1957 |